United States Patent
Hosotani et al.

(10) Patent No.: US 6,549,430 B1
(45) Date of Patent: Apr. 15, 2003

(54) SWITCHING POWER SUPPLY CIRCUIT HAVING CONSTANT CURRENT CIRCUIT

(75) Inventors: Tatsuya Hosotani; Hiroshi Takemura, both of Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/534,246

(22) Filed: Mar. 23, 2000

(30) Foreign Application Priority Data

Apr. 5, 1999 (JP) .......................................... 11-098074

(51) Int. Cl.[7] .............................................. H02M 3/335
(52) U.S. Cl. ..................................... 363/21.08; 363/21.1
(58) Field of Search ................................ 363/21.08, 97, 363/131, 78, 21.1

(56) References Cited

U.S. PATENT DOCUMENTS

| | | | | |
|---|---|---|---|---|
| 4,037,271 A | * | 7/1977 | Keller | 363/21 |
| 5,014,178 A | * | 5/1991 | Balakrishnan | 363/21 |
| 5,060,131 A | * | 10/1991 | Sikora | 363/21 |
| 5,581,451 A | * | 12/1996 | Ochiai | 363/21 |
| 5,729,448 A | * | 3/1998 | Haynie et al. | 363/97 |

FOREIGN PATENT DOCUMENTS

| | | | |
|---|---|---|---|
| JP | 58176593 | | 11/1983 |
| JP | 6113586 | | 1/1986 |
| JP | 61-13586 | * | 1/1986 |
| JP | 6215544 | | 5/1993 |
| JP | 10-108462 | * | 4/1998 |

* cited by examiner

Primary Examiner—Shawn Riley
(74) Attorney, Agent, or Firm—Keating & Bennett, LLP (57) ABSTRACT

A switching power supply circuit including a transformer having a primary winding, a secondary winding, and a feedback winding; a direct-current power supply of which one end is connected to one end of said primary winding; a switching element connected in series between the other end of said direct-current power supply and the other end of said primary winding; a control circuit provided between the control terminal of said switching element and said feedback winding; a rectifying circuit connected to said secondary winding; and a constant-current circuit provided between the one end of said primary winding and the control circuit or the control terminal of said switching element.

5 Claims, 6 Drawing Sheets

SWITCHING POWER SUPPLY CIRCUIT HAVING CONSTANT CURRENT CIRCUIT

BACKGROUND OF THE INVENTION

1. Field of the Invention

The present invention relates to a low-loss switching power supply circuit that has overcurrent characteristics.

2. Description of the Related Art

Figure 9:
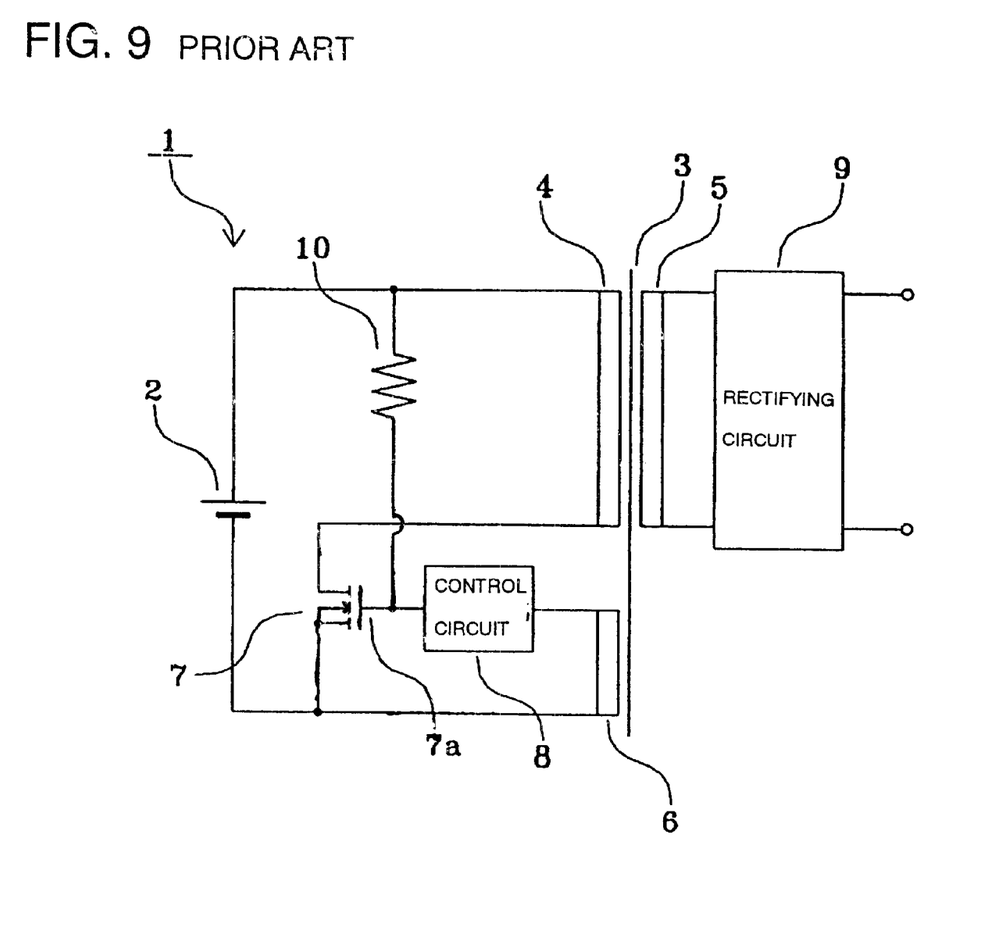
FIG. 9 is a circuit diagram showing a conventional switching power supply circuit.

A conventional switching power supply circuit is shown in FIG. 9. Referring to FIG. 9, a switching power supply circuit 1 is a self-excited switching power supply circuit, and is comprised of a direct-current power supply 2, a transformer 3 having a primary winding 4, a secondary winding 5, and feedback winding 6 wound around the transformer 3, a FET 7 as a switching element, a control circuit 8, a rectifying circuit 9, and a starting resistor 10. Herein, one end of the primary winding 4 is connected to one end of the direct-current power supply 2, and the other end is connected in series with the other end of the direct-current power supply 2 through the intermediary of the FET 7. One end of the feedback winding 6 is connected to a gate 7a as the control terminal of the FET 7, through the intermediary of the control circuit 8. The rectifying circuit 9 is connected to the secondary winding 5. Also, the one end of the primary winding 4 is connected to the connection point between the gate 7a of the FET 7 and the control circuit 8 through the intermediary of a starting resistor 10. Herein, the resistance value of the starting resistor 10 varies depending on the voltage of the direct-current power supply 2, but is, for example, about 390 kΩ if the voltage of the direct-current power supply 2 is 140 V.

In the switching power supply circuit 1 described, firstly a bias current flows from the direct-current power supply 2 into the gate 7a of the FET 7 through the starting resistor 10. Since there is an internal capacitance between the gate and the source of the FET, the potential of the gate 7 rises in a given time, and the FET 7 conducts at the point in time when the threshold value of the FET is exceeded, so that a current begins to flow through the primary winding 4. Thereafter, the FET 7 alternately conducts and switches off repeatedly by means of the control circuit 8, and thereby an alternating voltage is induced in the secondary winding 5. By rectifying this alternating voltage by means of the rectifying circuit 9, an output of the direct-current voltage is obtained.

Incidentally, in the switching power supply circuit 1, the voltage of the direct-current power supply 2 is not always constant, but can vary. For example, if the voltage of the direct-current power supply 2 decreases, the current flowing into the gate 7a of the FET 7 through the starting resistor 10 decreases, and consequently the time that elapses before the FET 7 conducts increases, in other words, the starting time of the switching power supply 1 becoming longer. In contrast, if the voltage of the direct-current power supply 2 increases, the current flowing into the gate 7a of the FET 7 through the starting resistor 10 increases, and consequently the time that elapses before the FET 7 conducts decreases, in other words, the starting time of the switching power supply 1 becoming shorter. In addition to that, since the current flowing through the starting resistor 10 increases, the loss in the starting resistor 10 also increases. In general, there is a design need so that the FET conducts in a given starting time even if the voltage of direct-current power supply 2 is low, and hence the resistance value of the starting resistor 10 is set to a relatively low value. As a consequence, the current flowing through the starting resistor increases not only when the voltage of the direct-current power supply 2 is high, but also when it is an average voltage, which results in a considerably high loss.

In relation to such a problem, Japanese Unexamined Utility Model Publication No. 61-13586, and Japanese Unexamined Patent Publication No. 10-108462 have disclosed a structure wherein a constant-current circuit is provided between a starting resistor and the control terminal of a switching element. By disposing the constant-current circuit between the starting resistor and the control terminal of the switching element, it is possible to maintain constant the bias current flowing into the control terminal of the switching element irrespective of variations in the voltage of the direct-current power supply, and to maintain constant the starting time of a switching power supply and the loss in the starting resistor.

However, there is a problem that, in the structure wherein a constant-current circuit is provided between a starting resistor and the control terminal of a switching element, a bias current flows through the starting resistor, and hence it is impossible to avoid the loss in the starting resistor. Further, there is a problem that, in the case where an output is short-circuited when the voltage of the direct-current power supply is high, the occurrence of a large bias current shortens the starting time, making the switching element generate heat, and thus making it susceptible to damage.

SUMMARY OF THE INVENTION

The present invention can solve the aforementioned drawbacks associated with the conventional art and provides a switching power supply circuit capable of maintaining constant the current flowing into the control terminal of a switching element, reducing the loss, and further preventing the failure of the switching element when an output is short-circuited.

The switching power supply circuit of the present invention comprises: a transformer having a primary winding, a secondary winding, and a feedback winding; a direct-current power supply of which one end is connected to one end of the primary winding; a switching element connected in series between the other end of the direct-current power supply and the other end of the primary winding; a control circuit provided between the control terminal of the switching element and the feedback winding; a rectifying circuit connected to the secondary winding; and a constant-current circuit provided between the one end of the primary winding and one of the control circuit and the control terminal of the switching element.

According to the invention, it is possible to maintain constant the bias current flowing into the control circuit or the control terminal of the switching element irrespective of variations in the voltage of the direct-current power supply, and to maintain constant the starting time of the switching power supply circuit. Furthermore, it is also possible to avoid the loss to be caused by the current flowing through the starting resistor, because of the absence of the starting resistor connecting the one end of the primary winding with the control terminal of the switching element.

In addition, even if an output is short-circuited when the voltage of the direct-current power supply is high, the bias current flowing into the switching element or the control circuit is constant, and therefore the starting time is not shortened. Hence, the switching element does not generate more heat than is necessary, which permits the prevention of failure of the switching element.

For the purpose of illustrating the invention, there is shown in the drawings several forms which are presently

DETAILED DESCRIPTION OF EMBODIMENTS OF THE INVENTION

Hereinafter, the preferred embodiments of the present invention are explained in detail with reference to the drawings.

Figure 1:
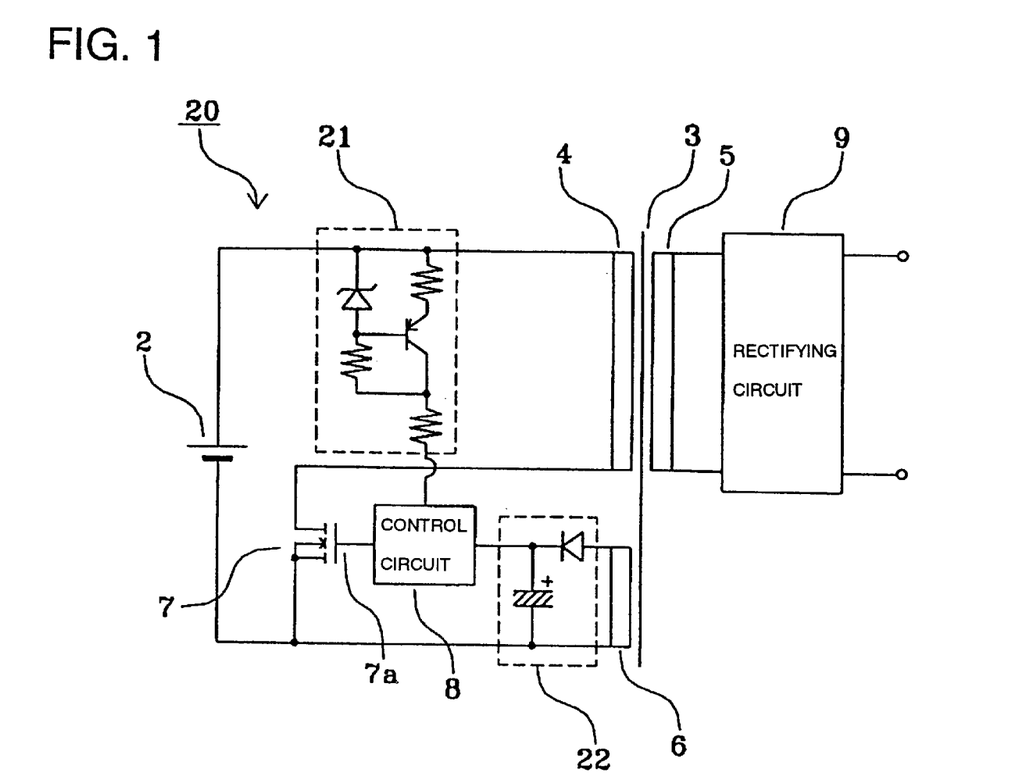
FIG. 1 is a circuit diagram showing an embodiment of the switching power supply circuit of the present invention.

FIG. 1 shows an embodiment of the switching power supply circuit of the present invention. In FIG. 1, the identical or like parts to parts in FIG. 9 are identified by the same reference characters, and the explanation thereof is omitted.

Referring to FIG. 1, a switching power supply circuit 20 is a separately excited switching power supply circuit. A rectifying circuit 22 for supplying a direct-current voltage for use in a control circuit is connected between a feedback winding 6 and the control circuit 8. Also, a constant-current circuit 21 for supplying the control circuit 8 with a bias current for starting is disposed between the one end of the primary winding 4 and the control circuit 8. The reason why this switching power supply circuit is arranged so as to supply the control circuit 8 with a bias current is that, in the case of a separately excited switching power supply circuit, it is necessary to firstly start the oscillator included in the control circuit 8. Here, the expression constant-current circuit represents a circuit capable of always supplying a substantially constant current.

Figure 2:
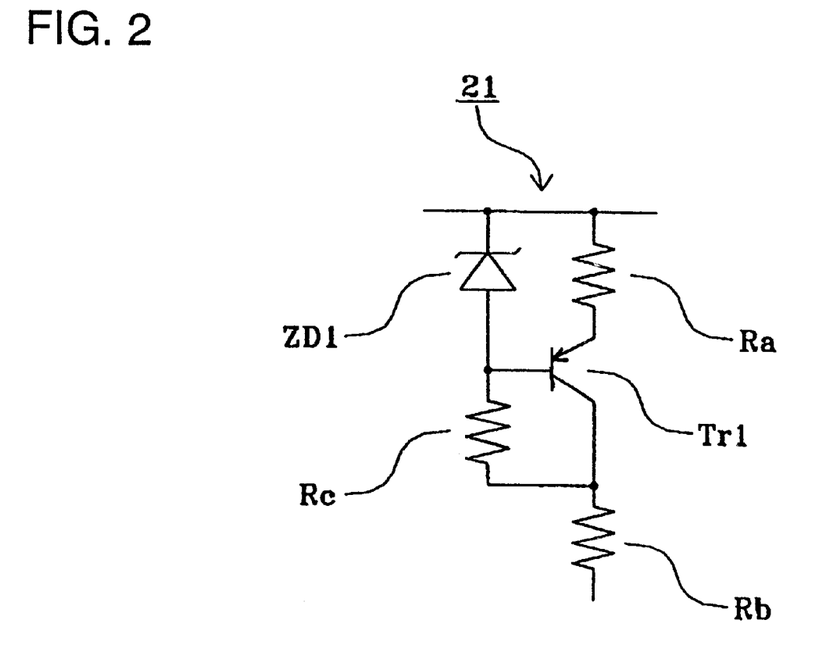
FIG. 2 is a circuit diagram showing the constant-current circuit of the switching power supply circuit shown in FIG. 1.

FIG. 2 shows the structure of a constant-current circuit 21 in detail. Referring to FIG. 2, the constant-current circuit 21 may be formed by connecting one end of a resistor Ra to one end of a primary winding 4 (not shown), connecting the emitter of a PNP type transistor Tr1 to the other end of the resistor Ra, connecting one end of a resistor Rb to the collector of the transistor Tr1, connecting the other end of the resistor Rb to a control circuit 8 (not shown), connecting the anode of a Zener diode ZD1, of which the cathode is connected to one end of the primary winding 4 (not shown), to the base of the Transistor Tr1, and connecting a resistor Rc between the collector and the base of the transistor Tr1.

In the constant-current circuit 21 having such a structure, if the voltage between the emitter and the base of the transistor Tr1 is denoted as Vbe, and if the Zener voltage of the Zener diode ZD1 is denoted as Vz, a constant-current having a magnitude of approximately (Vz−Vbe)/Ra flows through the resistor Rb via the resistor Ra and the emitter-collector of the transistor Tr1. Although a current also flows through the resistor Rc, it is negligible because the current value thereof is lower by about two digits than the current flowing through the resistor Rb.

Thus, in the switching power supply circuit 20, by connecting the constant-current circuit 21 between one end of the primary winding 4 and the control circuit 8, it is possible to maintain constant the current flowing into the control circuit 8, irrespective of variations in the voltage of the direct-current power supply 2. Maintaining constant the current flowing into the control circuit 8 makes it possible to maintain constant the switching conditions of the FET 7 and to maintain constant the starting time of the switching power supply circuit 20. In addition, in the switching power supply circuit 20, the absence of a starting resistor permits the avoiding of the loss to be caused by the current flowing through the starting resistor. Incidentally, though a bias current flows through the resistors Ra and Rb of the constant-current circuit 21, the resistance value of the resistor Ra varies primarily depending on the voltage of the Zener voltage VZ of the Zener diode ZD1, and it is on a scale of, for example, about 30 kΩ. Also, the resistance value of the resistor Rb varies depending on the voltage of the direct-current power supply 2, and it is on a scale of some tens of kiloohms. Thus, the resistance values of the resistors Ra and Rb are sufficiently small values in comparison with that of the starting resistor 10 in the switching power supply circuit 1, and hence, the loss in the resistors Ra and Rb are also sufficiently small, assuming the value of a bias current to be the same.

In the switching power supply circuit 20, even if the output of the rectifying circuit 9 is short-circuited when the voltage of the direct-current power supply 2 is high, the bias current flowing into the control circuit 8 is constant, and therefore the starting times of the control circuit 8 and the FET 7 as a switching element are not shortened. Hence, the FET 7 does not generate more heat than is necessary, which prevents failure of the FET 7.

Figure 3:
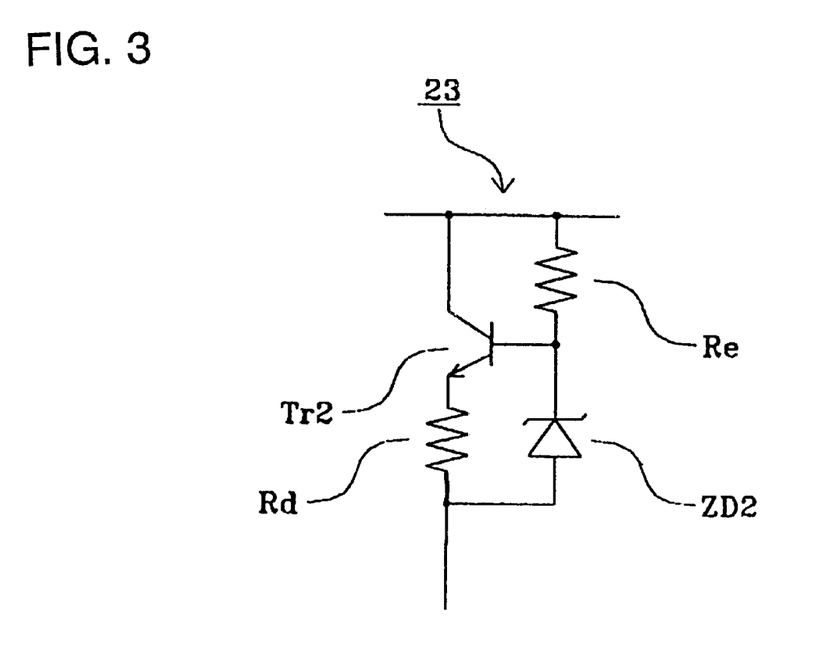
FIG. 3 is a circuit diagram showing another example of the constant-current circuit used for the switching power supply circuit of the present invention.

FIG. 3 shows another embodiment of a constant-current circuit used for the switching power supply circuit in the preset invention. Referring to FIG. 3, a constant-current circuit 23 may be formed by connecting the collector of an NPN type transistor Tr2 to one end of a primary winding 4 (not shown), connecting the emitter of the transistor Tr2 to a control circuit 8 (not shown) through the intermediary of a resistor Rd, connecting a resistor Re between the collector and the base of the transistor Tr2, connecting the cathode of a Zener diode ZD2 to the base of the transistor Tr2, and connecting the anode of the Zener diode ZD2 to the control circuit 8 (not shown).

In the constant-current circuit 23 having such a structure, if the voltage between the emitter and the base of the transistor Tr2 is denoted as Vbe, and if the Zener voltage of the Zener diode ZD2 is denoted as Vz, a constant-current having a magnitude of approximately (Vz−Vbe)/Rd flows through the resistor Rd via the collector-emitter of the transistor Tr2. Although a current also flows through the resistor Re, it is negligible because the current value thereof is lower by about two digits than the current flowing through the resistor Rd. The resistance value of the resistor Rd is a sufficiently small value in comparison with that of the starting resistor 10 in the switching power supply circuit 1, and hence the loss in the resistor Rd is also sufficiently small.

Figure 4:
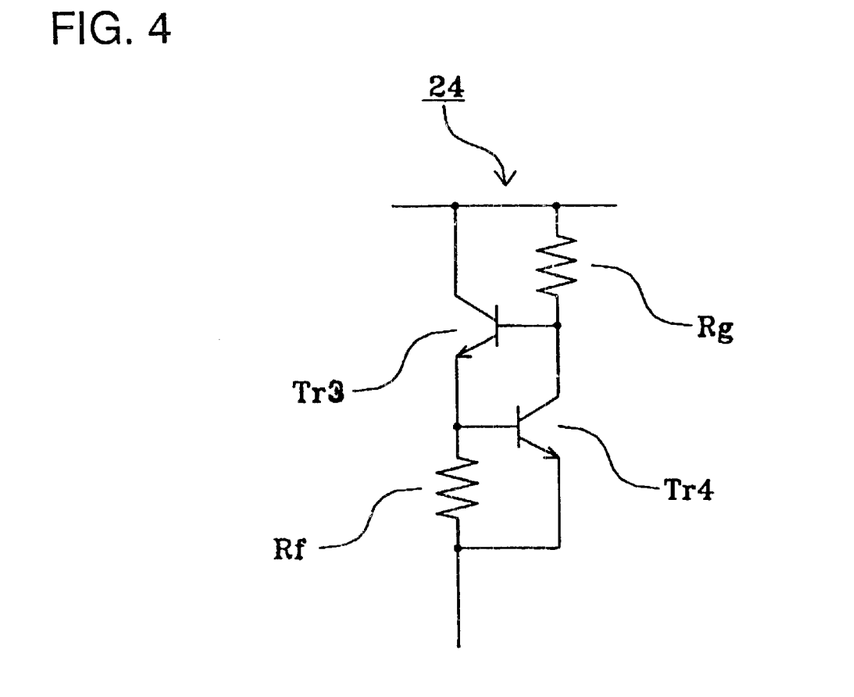
FIG. 4 is a circuit diagram showing still another example of the constant-current circuit used for the switching power supply circuit of the present invention.

FIG. 4 shows still another embodiment of a constant-current circuit used for the switching power supply circuit in the preset invention. Referring to FIG. 4, a constant-current circuit 24 may be formed by connecting the collector of an NPN type transistor Tr3 to one end of a primary winding 4 (not shown), connecting the emitter of the transistor Tr3 to a control circuit 8 (not shown) through the intermediary of a resistor Rf, connecting a resistor Rg between the collector and the base of the transistor Tr3, connecting the collector of an NPN type transistor Tr4 to the base of the transistor Tr3, and connecting the base of the transistor Tr4 to the emitter of the transistor Tr3, and connecting the emitter of the transistor Tr4 to the control circuit 8 (not shown).

In the constant-current circuit 24 having such a structure, if the voltage between the emitter and the base of the transistor Tr4 is denoted as Vbe, a constant-current having a magnitude of approximately Vbe/Rf flows through the resistor Rf via the collector-emitter of the transistor Tr3. Although a current also flows through the resistor Rg, it is negligible because the current value thereof is lower by about two digits than the current flowing through the resistor Rf. The resistance value of resistor Rf is a sufficiently small value in comparison with that of the starting resistor 10 in the switching power supply circuit 1, and hence the loss in the resistor Rf is also sufficiently small.

Figure 5:
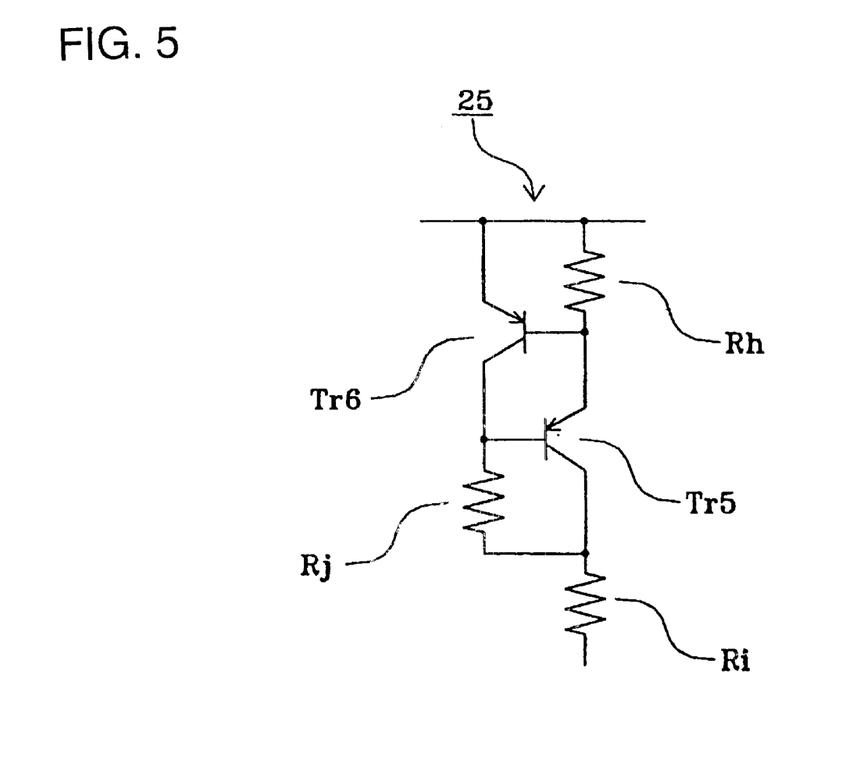
FIG. 5 is a circuit diagram showing a further example of the constant-current circuit used for the switching power supply circuit of the present invention.

FIG. 5 shows a further embodiment of a constant-current circuit used for the switching power supply circuit in the preset invention. Referring to FIG. 5, a constant-current circuit 25 may be formed by connecting one end of a resistor Rh to one end of a primary winding 4 (not shown), connecting the other end of the resistor Rh to the emitter of a PNP type transistor Tr5, connecting the collector of the transistor Tr5 to a control circuit 8 (not shown) through the intermediary of a resistor Ri, connecting the emitter of a PNP type transistor Tr6 to the one end of the resistor Rh, connecting the base of the Transistor Tr6 to the other end of the resistor Rh, and connecting the collector of the transistor Tr6 to the base of the transistor Tr5, and connecting a resistor Rj between the collector and the base of the Transistor Tr5.

In the constant-current circuit 25 having such a structure, if the voltage between the emitter and the base of the transistor Tr6 is denoted as Vbe, a constant-current having a magnitude of approximately Vbe/Rh flows through the resistor Ri via the resistor Rh and the emitter-collector of transistor Tr5. Although a current also flows through the resistor Rj, it is negligible because the current value thereof is lower by about two digits than the current flowing through the resistor Rh. The resistance values of the resistors Rh and Ri are sufficiently small values in comparison with that of the starting resistor 10 in the switching power supply circuit 1, and hence the losses in the resistors Rh and Ri are also sufficiently small.

Figure 6:
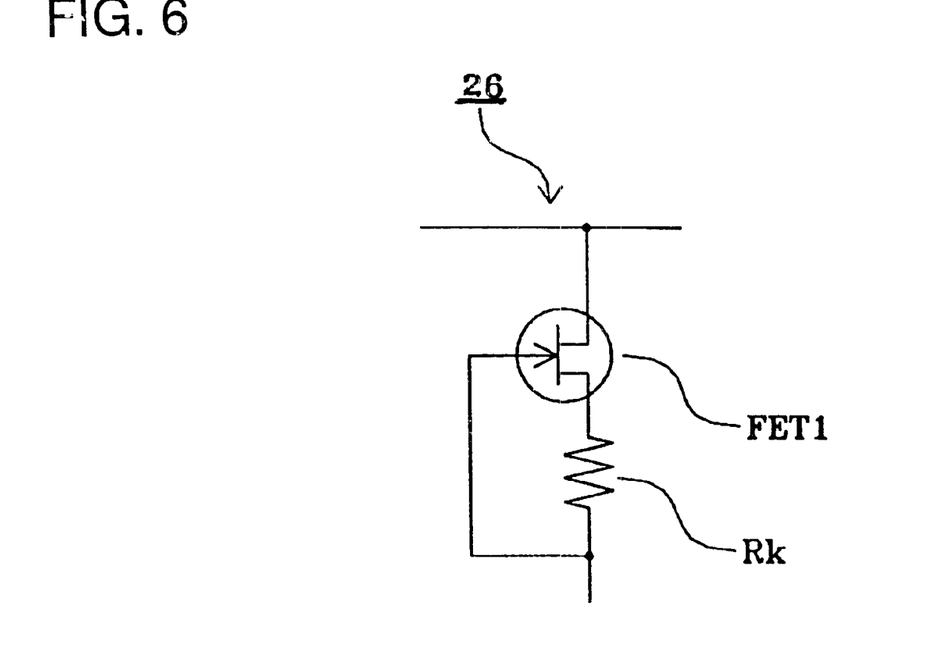
FIG. 6 is a circuit diagram showing yet a further example of the constant-current circuit used for the switching power supply circuit of the present invention.

FIG. 6 shows a yet further embodiment of a constant-current circuit used for the switching power supply circuit in the preset invention. Referring to FIG. 6, a constant-current circuit 26 may be formed by connecting an N channel type junction field effect transistor FET 1 to a primary winding 4 (not shown), connecting the source of the field effect transistor FET1 to a control circuit 8 (not shown) through the intermediary of the resistor Rk, and connecting the gate of the field effect transistor FET1 with the control circuit 8.

In the constant-current circuit 26 having such a structure, if the voltage between the gate and the source of the field effect transistor FET1 is denoted as Vgs, and if the mutual conductance is denoted as gm, a constant-current having a magnitude of gm×Vgs flows between the drain and the source of the field effect transistor FET1. Herein, this current varies depending on the magnitude of the resistance value of the resistor Rk. The resistance value of the resistor Rk is a sufficiently small value in comparison with that of the starting resistor 10 in the switching power supply circuit 1, and hence the loss in the resistors Rk is also sufficiently small. Here, the resistor Rk is not an absolute necessity. When the resistor Rk is not employed, the loss to be caused thereby becomes zero.

Figure 7:
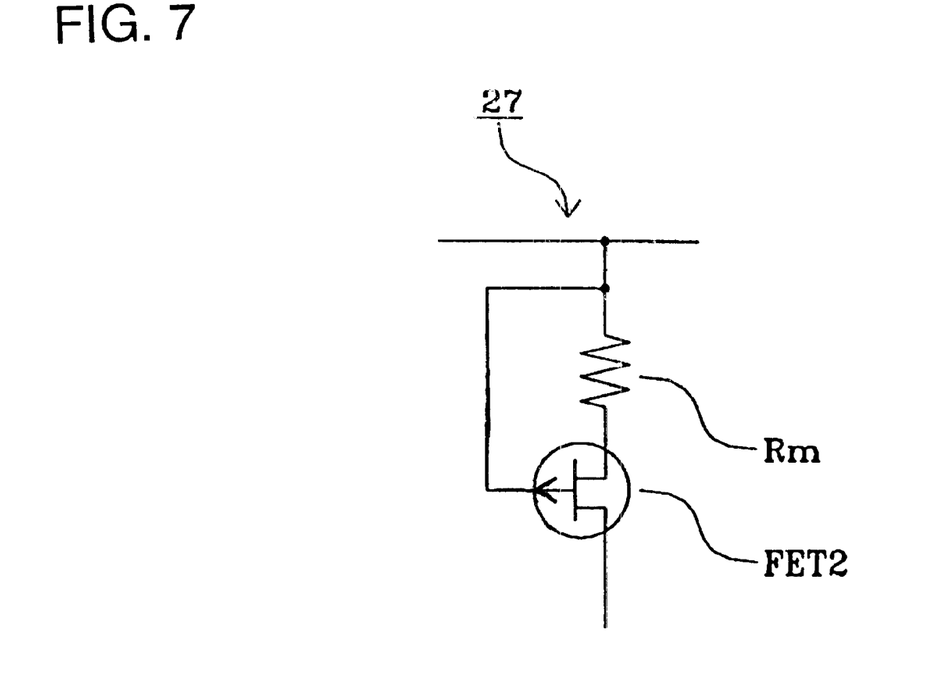
FIG. 7 is a circuit diagram showing yet a further example of the constant-current circuit used for the switching power supply circuit of the present invention.

FIG. 7 shows a yet further embodiment of a constant-current circuit used for the switching power supply circuit in the preset invention. Referring to FIG. 7, a constant-current circuit 27 may be formed by connecting one end of the primary winding 4 (not shown) to the P channel type junction field effect transistor FET 2 through the intermediary of the resistor Rm, and connecting the source of the field effect transistor FET 2 to a control circuit 8 (not shown), and connecting the gate of the junction field effect transistor FET 2 to one end of a primary winding 4 (not shown).

In the constant-current circuit 27 having such a structure, if the voltage between the gate and the source of the field effect transistor FET 2 is denoted as Vgs, and if the mutual conductance is denoted as gm, a constant-current having a magnitude of gm×Vgs flows between the drain and the source of the field effect transistor FRET 2. Herein, this current varies depending on the magnitude of the resistance value of the resistor Rm. The resistance value of the resistor Rm is a sufficiently small value in comparison with that of the starting resistor 10 in the switching power supply circuit 1, and hence the loss in the resistors Rm is also sufficiently small. Here, the resistor Rm is not an absolute necessity. When the resistor Rm is not employed, the loss to be caused thereby becomes zero.

Figure 8:
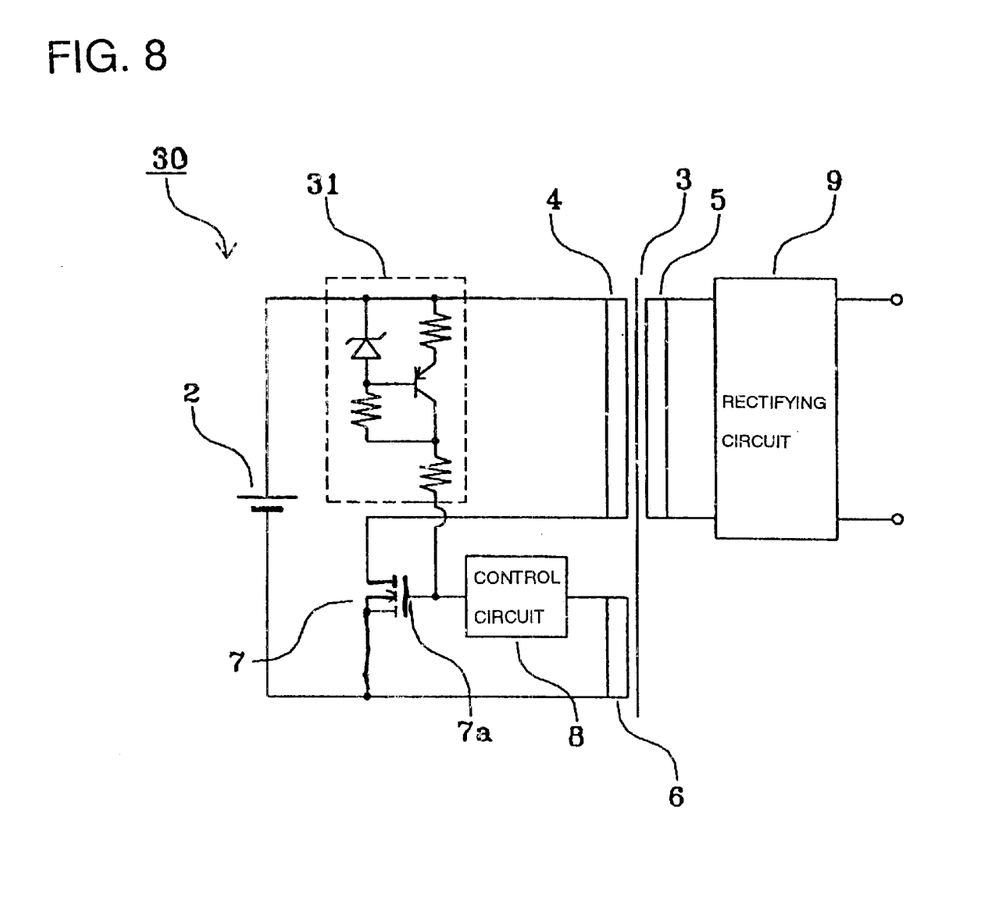
FIG. 8 is a circuit diagram showing another embodiment of the switching power supply circuit of the present invention.

FIG. 8 shows a yet further embodiment of a constant-current circuit used for the switching power supply circuit in the preset invention. In FIG. 8, the identical or like parts to parts in FIG. 9 are identified by the same reference characters, and the description thereof is omitted.

Referring to FIG. 8, a switching power source 30 is a self-excited switching power supply circuit. A constant-current circuit 31 is connected between one end of a primary winding 4 and the gate 7a of FET 7. In the case of a self-excited switching power supply circuit, the reason why the constant-current circuit 31 is connected to the gate 7a of the FET 7 is that the switching power supply circuit begins to oscillate by starting the FET 7. The structure of the constant-current circuit 31 is the same as that of the constant-current circuit 21 shown FIG. 2, and also the function thereof is similar to the constant-current circuit 21.

In the switching power supply circuit 30 having such a structure, since a constant bias current flows into the gate 7a of the FET 7 through the constant-current circuit 31, it is possible to maintain constant the starting time of the switching power supply circuit 30, irrespective of variations in the voltage of the direct-current power supply. Further, in the switching power supply circuit 30, the absence of the starting resistor permits the avoiding of the loss to be caused by the current flowing through the starting resistor.

In the switching power supply circuit 30, even if the output of the rectifying circuit 9 is short-circuited when the voltage of the direct-current power supply 2 is high, the bias current flowing into the FET 7 is constant, and therefore the starting time of the FET 7 as a switching element is not shortened. Hence, the FET 7 does not generate more heat than is necessary, which prevents failure of the FET 7.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply circuit comprising:
    a transformer having a primary winding having first and second ends, a secondary winding, and a feedback winding;
    a direct-current power supply having first and second terminals, the first terminal being connected to the first end of said primary winding;
    a switching element connected in series between the second terminal of said direct-current power supply and the second end of said primary winding;
    a control circuit provided between a control terminal of said switching element and said feedback winding;
    a rectifying circuit connected to said secondary winding; and
    a constant-current circuit provided between the first end of said primary winding and a circuit point comprising an input of the control circuit or the control terminal of said switching element.

2. The switching power supply circuit of claim 1, wherein the constant-current circuit comprises a transistor coupled to a zener diode, the zener diode establishing a reference potential for determining a substantially constant current through the transistor.

3. The switching power supply circuit of claim 1, wherein the constant-current circuit comprises two interconnected transistors with a base-emitter voltage of one of the transistors establishing a substantially constant-current through the other of the transistors.

4. The switching power supply circuit of claim 1, wherein the constant-current circuit comprises a JFET and a resistor coupled in series with a control terminal of the JFET coupled to an end of the resistor not connected to a main terminal of the JFET.

5. The switching power supply circuit of claim 1, further comprising a rectifying and filtering circuit disposed between the feedback winding and the control circuit.

* * * * *